(12) United States Patent
Berning et al.

(10) Patent No.: US 9,764,910 B2
(45) Date of Patent: Sep. 19, 2017

(54) AUTOMOTIVE MILLING MACHINE, AS WELL AS METHOD FOR DISCHARGING MILLED MATERIAL

(71) Applicant: Wirtgen GmbH, Windhagen (DE)

(72) Inventors: Christian Berning, Zuelpich (DE); Sebastian Winkels, Windeck (DE); Harald Kroell, Unkel (DE); Tobias Krista, Bonn (DE)

(73) Assignee: Wirtgen GmbH (DE)

( * ) Notice: Subject to any disclaimer, the term of this patent is extended or adjusted under 35 U.S.C. 154(b) by 128 days.

(21) Appl. No.: 14/827,450

(22) Filed: Aug. 17, 2015

(65) Prior Publication Data

US 2016/0052731 A1 Feb. 25, 2016

(30) Foreign Application Priority Data

Aug. 22, 2014 (DE) .................... 10 2014 216 763

(51) Int. Cl.
*B65G 67/22* (2006.01)
*G06T 7/00* (2017.01)
(Continued)

(52) U.S. Cl.
CPC ........... *B65G 67/22* (2013.01); *B65G 41/002* (2013.01); *E01C 23/088* (2013.01);
(Continued)

(58) Field of Classification Search
CPC ......... G06T 7/0002; G06T 7/20; G06T 7/254; G06T 7/97; G06T 2207/30204;
(Continued)

(56) References Cited

U.S. PATENT DOCUMENTS

| 3,608,968 A | 9/1971 | Burnett ........................... 299/39 |
| 4,376,609 A | 3/1983 | Bohman et al. .............. 414/335 |

(Continued)

FOREIGN PATENT DOCUMENTS

| CN | 103628398 A | 3/2014 | ........... E01C 23/088 |
| CN | 204875465 | 12/2015 | ........... E01C 23/088 |

(Continued)

OTHER PUBLICATIONS

Database Compendex XP-002538700, Engineering Information, Inc., Wolski Jan K, "Optimization of Bucket Wheel Excavator and Pit Parameters in Application to Overburden Stripping", Conference Proceeding "Use of Computers in the Coal Industry",1986, pp. 43-55.

(Continued)

*Primary Examiner* — Andrew W Johns
(74) *Attorney, Agent, or Firm* — Lucian Wayne Beavers; Patterson Intellectual Property Law, PC

(57) ABSTRACT

In an automotive milling machine, comprising a machine frame, comprising a controller for the travelling and milling operation, comprising a working drum, comprising a transport conveyor slewable relative to the machine frame, where the transport conveyor discharges the milled material onto a point of impingement on a loading surface of different transport vehicles, where the controller comprises a detection and control unit which monitors the alterable position of the loading surface of the transport vehicle by an image-recording system comprising no less than one sensor which continuously generates no less than one digital image of, as a minimum, the loading surface, it is provided for the following features to be achieved: the detection and control unit comprises an analysis device which detects faults or errors in the image generated by the no less than one sensor.

18 Claims, 4 Drawing Sheets

(51) Int. Cl.
*E01C 23/088* (2006.01)
*E01C 23/12* (2006.01)
*G05D 1/00* (2006.01)
*B65G 41/00* (2006.01)
*G05D 1/02* (2006.01)

(52) U.S. Cl.
CPC ......... *E01C 23/127* (2013.01); *G05D 1/0088* (2013.01); *G05D 1/0246* (2013.01); *G05D 1/0293* (2013.01); *G05D 2201/0202* (2013.01)

(58) Field of Classification Search
CPC .. G06T 2207/30252; G05D 2201/0202; G05D 2201/021; B65G 67/08; B65G 67/22; E01C 23/088; E01C 23/127
See application file for complete search history.

(56) References Cited

U.S. PATENT DOCUMENTS

| | | | |
|---|---|---|---|
| 4,863,009 A | 9/1989 | Winkel et al. | 198/505 |
| 5,575,316 A | 11/1996 | Pollklas | 141/198 |
| 5,749,783 A | 5/1998 | Pollklas | 460/119 |
| 5,857,274 A | 1/1999 | Rüdiger et al. | 37/190 |
| 6,247,510 B1 | 6/2001 | Diekhans et al. | 141/231 |
| 6,366,684 B1 | 4/2002 | Gerard et al. | 382/132 |
| 6,682,416 B2 | 1/2004 | Behnke et al. | 460/114 |
| 6,943,824 B2 | 9/2005 | Alexia et al. | 348/89 |
| 7,831,345 B2 | 11/2010 | Heino et al. | 701/23 |
| 8,499,537 B2 | 8/2013 | Correns et al. | 56/10.2 E |
| 8,528,988 B2 | 9/2013 | Von Schönebeck et al. | 299/1.5 |
| 8,590,983 B2 | 11/2013 | Berning et al. | 299/39.4 |
| 8,979,424 B2 | 3/2015 | Berning et al. | E01C 23/088 |
| 2005/0179309 A1 | 8/2005 | Berning et al. | 299/39.2 |
| 2005/0207841 A1 | 9/2005 | Holl et al. | 404/94 |
| 2006/0045621 A1 | 3/2006 | Potts et al. | 404/91 |
| 2008/0216021 A1 | 9/2008 | Berning et al. | 715/846 |
| 2009/0044505 A1 | 2/2009 | Huster et al. | 56/10.2 R |
| 2009/0229233 A1 | 9/2009 | Pollklas et al. | 56/10.2 R |
| 2009/0267402 A1 | 10/2009 | Berning et al. | 299/39.4 |
| 2010/0014917 A1 | 1/2010 | Willis et al. | 404/93 |
| 2010/0296867 A1 | 11/2010 | Buschmann et al. | 404/108 |
| 2011/0061762 A1 | 3/2011 | Madsen et al. | 141/1 |
| 2011/0064274 A1 | 3/2011 | Madsen et al. | 382/104 |
| 2011/0080034 A1 | 4/2011 | Schönebeck et al. | 299/1.5 |
| 2011/0123268 A1 | 5/2011 | Berning et al. | 404/90 |
| 2013/0076101 A1 | 3/2013 | Simon | 299/39.2 |
| 2013/0080000 A1 | 3/2013 | Von der Lippe et al. | 701/50 |
| 2013/0227922 A1 | 9/2013 | Zametzer et al. | A01D 41/127 |
| 2015/0218762 A1 | 8/2015 | Berning et al. | E01C 23/088 |
| 2016/0052731 A1 | 2/2016 | Berning et al. | B65G 67/22 |
| 2016/0208447 A1 | 7/2016 | Berning et al. | E01C 23/088 |

FOREIGN PATENT DOCUMENTS

| | | | |
|---|---|---|---|
| DE | 155157 | 5/1982 | B65G 67/22 |
| DE | 19628420 A1 | 1/1998 | E02F 3/18 |
| DE | 102005035480 A1 | 2/2007 | E01C 23/088 |
| DE | 202007005756 U1 | 8/2008 | E01C 23/088 |
| DE | 102009041842 A1 | 9/2011 | E01C 23/088 |
| EP | 0666018 A1 | 8/1995 | A01D 43/06 |
| EP | 1344445 A1 | 9/2003 | A01D 43/06 |
| EP | 1574122 B1 | 2/2008 | A01D 41/127 |
| EP | 2100495 A1 | 9/2009 | A01D 43/073 |
| EP | 2301318 B1 | 11/2011 | A01D 43/073 |
| EP | 2452551 A2 | 5/2012 | A01D 43/08 |
| EP | 2573266 A2 | 3/2013 | E01C 23/088 |
| EP | 2573267 A1 | 3/2013 | E01C 23/088 |
| WO | 2009098294 A2 | 8/2009 | E21C 41/26 |
| WO | 2014029824 A1 | 2/2014 | E01C 23/088 |

OTHER PUBLICATIONS

Database Compendex XP-002538699, Engineering Information, Inc., Gove et al "Optimizing Truck-Loader Matching", Mining Engineering, Oct. 1994, pp. 1179-1185, Soc. for Mining, Metallurgy & Exploration, Inc.

Chinese Search Report in corresponding Chinese Application No. 2015105239210, 2 pp. (not prior art), dated Feb. 7, 2017.

AUTOMOTIVE MILLING MACHINE, AS WELL AS METHOD FOR DISCHARGING MILLED MATERIAL

BACKGROUND OF THE INVENTION

1. Field of the Invention

The invention relates to an automotive milling machine, as well as a method for discharging milled material, and a road or ground working unit.

2. Description of the Prior Art

With an automotive milling machine, it is known to discharge the milled material onto no less than one transport vehicle comprising a loading surface.

The milling machine comprises a controller for the travelling and milling operation, as well as a working drum for the milling of, for example, a road pavement. A transport conveyor device, for example, a transport conveyor device comprising no less than one transport conveyor, is present in front of or behind the working drum as seen in the direction of travel. The transport conveyor device comprises a discharge end at which the milled material is discharged onto the loading surface of the no less than one transport vehicle via a flight path in the form of a parabolic trajectory attributable to the conveying speed. The last or single transport conveyor of the transport conveyor device as seen in the direction of transport may be slewed sideways, relative to the longitudinal axis of the milling machine, under a specifiable slewing angle to the left or right and may be adjustable in height via a specifiable elevation angle. In addition, the conveying speed of the transport conveyor may be adjustable.

In practical operation, problems arise in coordinating the milling machine with the transport vehicle.

With a forward-loading milling machine, for example, the milled material is discharged towards the front onto the transport vehicle driving ahead. The operator of the milling machine needs to signal to the vehicle driver of the transport vehicle as to when the transport vehicle is to continue moving forward and when it is to stop. This leads to problems because the operator basically needs to concentrate on the milling process and at the same time needs to avoid a collision with the transport vehicle driving ahead.

An additional problem lies in the fact that the operator of the milling machine also needs to deal with loading the loading surface by adjusting the slewing angle, elevation angle and conveying speed of the last or single transport conveyor of the transport conveyor device as seen in the direction of transport and is thus distracted from his actual task of carrying out the milling operation.

In case of a rearward-loading milling machine, problems also arise in coordinating the milling machine with the transport vehicle especially as the transport vehicle needs to drive behind the milling machine in reverse travel. An even higher level of stress results for the operator of the milling machine as he needs to control the milling operation in forward travel on the one hand, and needs to monitor loading of the transport vehicle behind the milling machine as seen in the direction of travel, needs to control the slewing angle, elevation angle and/or conveying speed of the transport conveyor device, and needs to communicate the necessary information to the vehicle driver on the other.

It is known from DE 10 2012 215 013 A (US 2015/0218762) for a detection and control unit to be able to locate the position of the loading surface and/or of the transport conveyor of a transport conveyor device continuously by means of an image-recording system, where the image data serve to determine the position of the loading surface in relation to the machine frame or to the slewable transport conveyor Positioning of the milled material on the loading surface may be continuously controlled automatically by the detection and control system in such a fashion that the milled material is discharged onto the centre of the loading surface or another specifiable point of impingement within the loading surface.

In practical operation of the milling machine, the image-recording system may be disturbed by weather conditions, branches of trees, glare or other influences and may thus, at least temporarily, impair the automatic control process.

SUMMARY OF THE INVENTION

It is therefore the object of the invention to specify an automotive milling machine as well as a method for discharging milled material of a milling machine which is intended to improve the reliability of the control process and to avoid controlling errors.

The invention advantageously specifies for the detection and control unit to comprise an analysis device which analyses faults or errors in the image.

It is preferably specified for the analysis device to generate a warning signal or control signal in the event of faults or errors. The operator of the milling machine is thus alerted in good time to whether a fault or an error in the image has been detected so that his attention can be increased in particular with regard to monitoring the automatic control process.

The control signal can be used, for example, to stop the milling operation or to generate an emergency-stop signal.

It may in particular be specified for the analysis device to comprise a frozen-image detection device which monitors the failure or an alteration over time of the image signals of the image pixels of the digital image.

The operator is thus informed immediately in the event of a failure of the image signals or in the event of the image signals freezing, or there is a direct intervention in the controller of the milling machine.

The frozen-image detection device may monitor the alteration over time of all or of a part of the image pixels of the digital image.

The frozen-image detection device may also monitor the alteration over time of a mark present in the image field, said mark being alterable in a defined fashion. In this design, the mark is arranged, for example, in a fixed position relative to the machine frame or in a fixed position relative to the transport conveyor in such a fashion that it is detected by the image-recording system. In this arrangement, the mark is designed in a defined fashion so as to enable the image-recording system to identify and monitor the mark.

The defined mark may alter its appearance over time, for example, by means of rotation so that, in the event of a stoppage of the rotating movement, a frozen image can be detected. This is useful in particular if neither the milling machine nor the transport vehicle is in motion.

The frozen-image detection device may alternatively also compare the digital image of two sensors pointed at the same image field and, as a minimum, detect a frozen image in the event that one of the two images freezes.

A preferred embodiment specifies for the analysis device to monitor image pixels for unchanging image information and to issue a warning signal or a control signal if a part of the image information remains unchanged over a specifiable period of time.

It may additionally be specified, independent of the frozen-image detection, for the analysis device to detect, by means of a mark present in the image field, an undesirable change in position of the no less than one sensor of the image-recording system relative to the machine frame or relative to the transport conveyor. Said mark may differ from the mark for frozen-image detection. If the mark is not located in a specified position within the image field, it may be concluded that the sensor or the image-recording system, respectively, has altered its original position, for example, as a result of a collision with an object, and that the image field no longer detects the originally specified image field.

According to an additional further development of the invention, it is specified for the analysis device, for the detection of glare, to monitor the presence of a maximum signal in, as a minimum, a part of the image pixels and to issue a warning signal or a control signal in case of glare.

In this arrangement, an electronic or optical dimming of the sensor may be effected in case of glare.

An alternative embodiment specifies for the detection and control unit, in case of glare, to pivot the sensor by a small angular amount without significantly changing the image field detected.

Furthermore, the image data may be analysed to the effect of determining how and to which extent the loading surface is filled. Controlling the conveying speed and/or the position of the discharge end of the transport conveyor or the point of impingement of the milled material, respectively, relative to the loading surface enables uniform loading of the loading surface. The filling condition on the loading surface may be detected and analysed by an image-recording system, and the conveying speed and/or the position of the discharge end of the transport conveyor relative to the loading surface may be continuously controlled in order to load the loading surface uniformly and/or in accordance with a specified loading programme.

According to the method according to the invention, it is specified that, for discharging worked-off milled material of an automotive milling machine onto a loading surface of a transport vehicle, in which the milling machine is controlled for the travelling and milling operation, the milled material worked off by a working drum is discharged onto the loading surface of a transport vehicle by means of a slewable transport conveyor, where the alterable position of the loading surface of the transport vehicle relative to the machine frame or relative to the transport conveyor is continuously monitored by a detection and control unit comprising an image-recording system which is used to continuously generate no less than one digital image of, as a minimum, the loading surface.

It may be specified that, for detection of a partial fault in the image, a group of connected image pixels is monitored for unchanging image information, and a warning signal or a control signal is issued if a part of the image information, for example, a group of connected image pixels, remains unchanged over a specifiable period of time or that temporary faults or errors of the image information are analysed by detecting a field of connected image pixels and/or the focusing status of the same and/or the direction of movement of the connected image pixels inside the image field.

Hereinafter, embodiments of the invention are illustrated in more detail with reference to the drawings.

BRIEF DESCRIPTION OF THE DRAWINGS

The following is shown.

DETAILED DESCRIPTION

Figure 1:
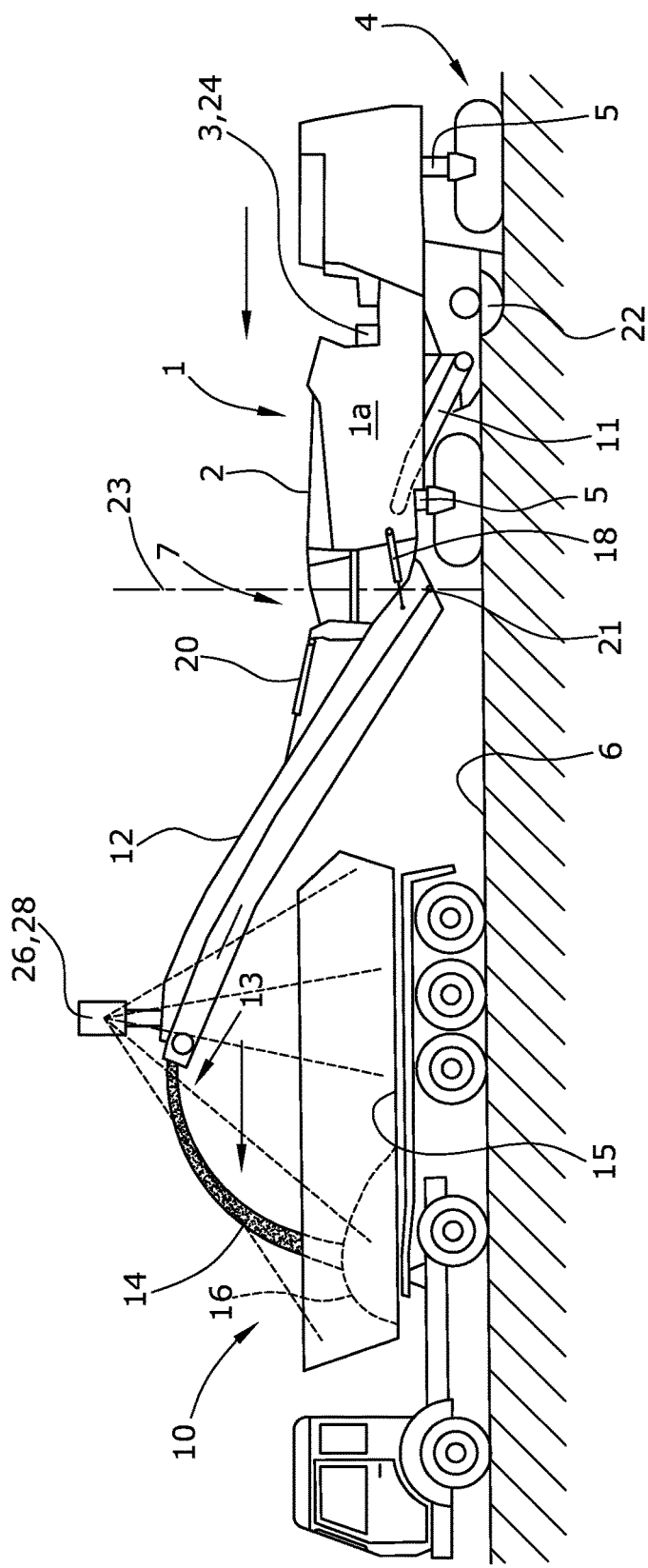
FIG. 1 a forward-loading road milling machine,
FIG. 2 a rearward-loading road milling machine,
FIG. 3 a top view of a milling machine according to FIG. 1, and
FIG. 4 a circuit diagram of the controller and the image-recording system.

FIG. 1 depicts a milling machine using as an example a forward-loading road milling machine 1a. The road milling machine 1 comprises a machine frame 2 which is supported by a chassis 4 comprised of, for example, tracked ground-engaging units or wheels, said chassis 4 being connected to the machine frame 2 via no less than three height adjustment devices in the form of lifting columns 5. As can be inferred from FIG. 1, the embodiment specifies four lifting columns 5 which can be used to bring the machine frame 2 into a specifiable plane extending preferably parallel to the road surface 6 which supports the tracked ground-engaging units or wheels of the chassis 4.

The road milling machine shown in FIG. 1 comprises, in longitudinal direction of the milling machine 1a, a working drum 22 between the tracked ground-engaging units of the chassis 4.

The milling machines 1a, 1b may comprise tracked ground-engaging units and/or wheels. The working drum may be adjustable in height via the lifting columns 5 supporting the machine frame 2 or relative to the machine frame 2.

Other designs of a milling machine 1b may also exhibit the working drum 22, for example, at the height of the rear tracked ground-engaging units or wheels of the chassis 4.

The transport conveyor device with no less than one transport conveyor 11, 12 for transporting away the milled-off milled material may also be arranged at the front end 7 or rear end 8 of the milling machine 1a, 1b.

Figure 2:
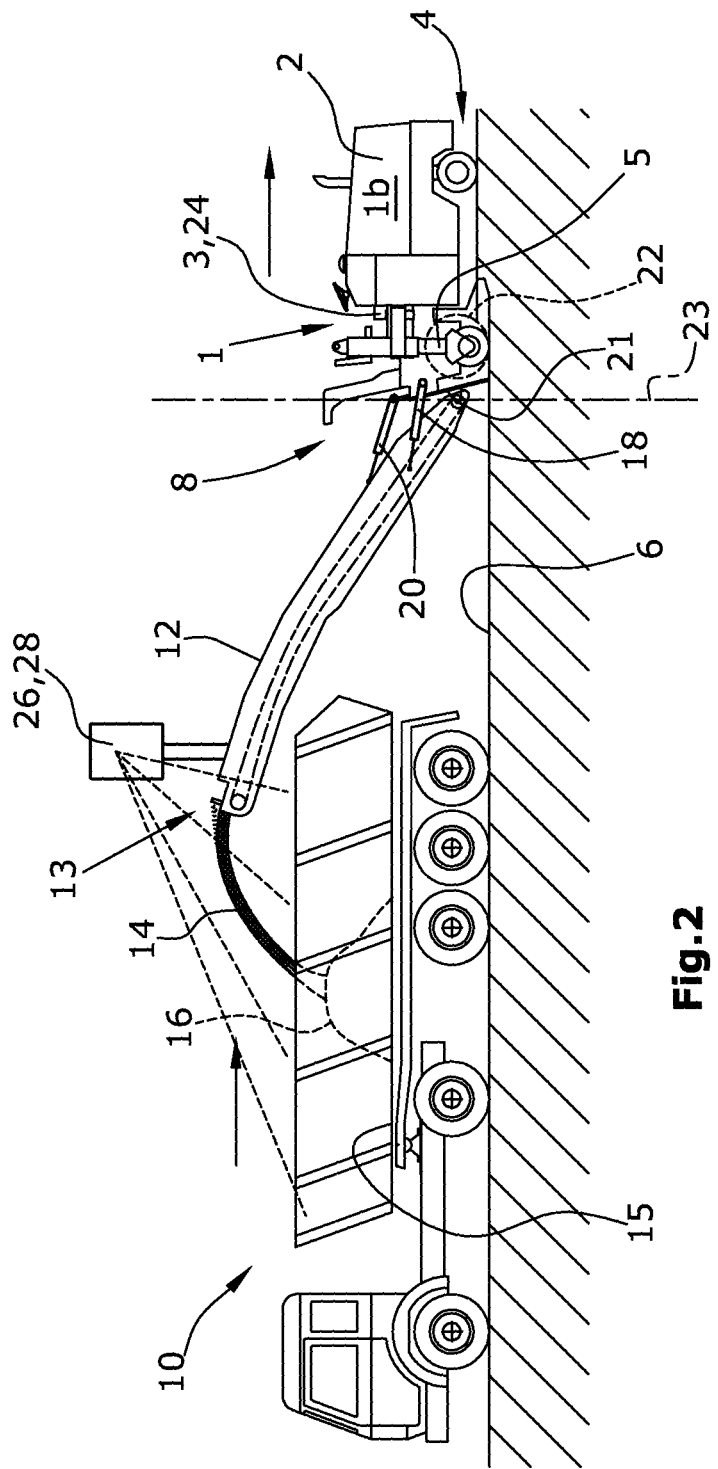

FIG. 2 depicts a rearward-loading milling machine 1b as an example in which the transport vehicle 10 drives behind the milling machine in reverse travel.

Figure 3:
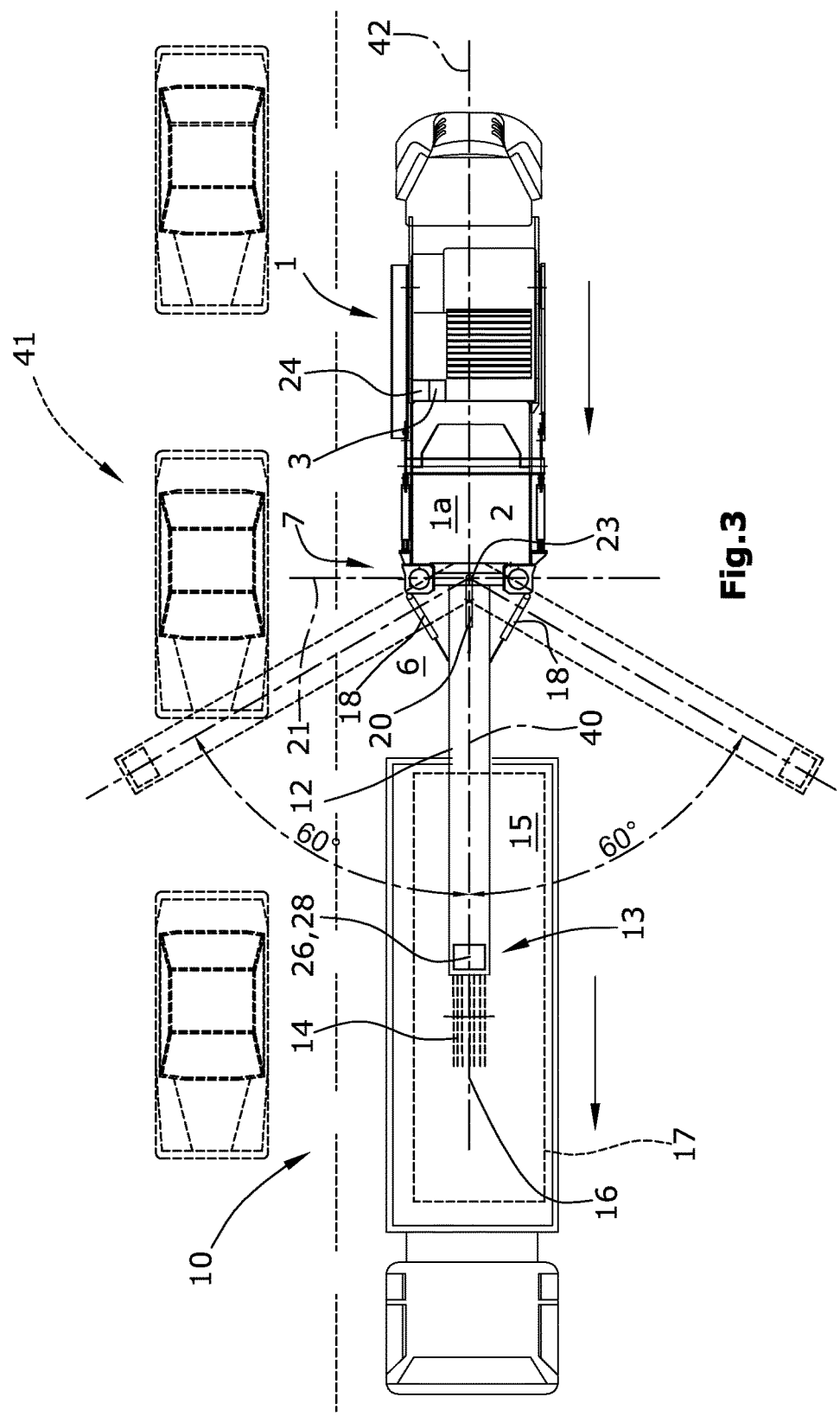
Figure 4:
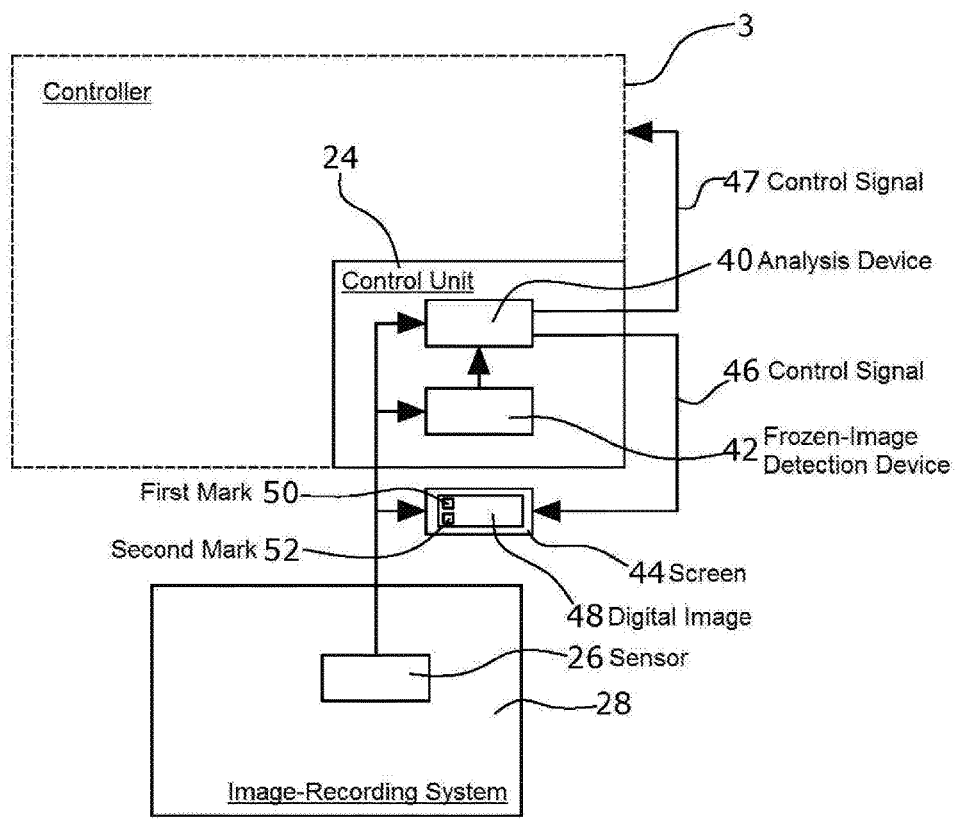

Provided that sufficient space is available on the side next to the milling machine 1a, 1b, the transport vehicle 10 may also be moved next to the milling machine 1 in forward travel as shown in FIG. 3. The directions of travel of the respective vehicles in FIGS. 1 to 3 are indicated by arrows.

In the embodiment shown in FIG. 1, the milled material milled off by the working drum 22 is discharged onto the loading surface 15 of the transport vehicle 10 via a first permanently installed transport conveyor 11 of the transport conveyor device which transfers the milled material 14 onto a second slewable transport conveyor 12. As a result of the speed of the transport conveyor 12, the milled material 14 is not discharged immediately at the end of the transport conveyor 12, but the milled material follows a parabolic trajectory so that the point of impingement 16 on the loading surface 15 is located at a distance from the free end 13 of the transport conveyor 12. The transport conveyor 12 may be slewed from a neutral position to the left or to the right via piston-cylinder units 18 in order to be able to discharge the milled material 14 onto the loading surface 15 even when cornering or in the event of the transport vehicle 10 driving in an offset track. In addition, the vehicle driver of the milling machine 1a, 1b can adjust the elevation angle of the transport conveyor 12 by means of a piston-cylinder unit 20. The elevation angle has an influence on the parabolic trajectory of the milled material 14 and on the position of the point of impingement 16, as has the conveying speed of the transport conveyor 12.

The currently adjusted elevation angle about a horizontal first axis 21 or slewing angle about a vertical second axis 23, respectively, is reported to a detection and control system 24 which additionally comprises no less than one image-recording system 28 comprising no less than one sensor 26, or is connected to the same, where said sensor 26 continuously detects the position of the loading surface 15 and/or of the transport conveyor 12. Said no less than one sensor 26 may be arranged, for example, at the milling machine 1a, 1b, at the end facing the transport conveyor 12, and/or at the free end 13 of the transport conveyor 12. Furthermore, the sensor 26, preferably an image sensor, may be arranged below or, as shown in the Figures, above the transport conveyor 12, as well as laterally on both sides of the transport conveyor 12.

The detection and control unit 24 continuously detects the position of the loading surface 15 and/or of the last or single transport conveyor 12 as seen in the direction of transport by means of an image-recording system 28 or a non-optical electronic positioning system which supplies data for determining the position of the loading surface 15 in relation to the machine frame 2 or to the transport conveyor 12. The no less than one digital image 48 provided by the image-recording system 28 may be evaluated by image-analysing methods which are known for themselves.

The detection and control unit 24 may be integrated into the controller 3 for the travelling and milling operation or may, as a minimum, be connected to the same in order to, should the need arise, also obtain data on the travel speed and/or a detected steering angle of the milling machine 1a, 1b and the conveying speed of the transport conveyor 12.

The detection and control unit 24 locates the alterable position of the loading surface 15 of the transport vehicle 10 and of the transport conveyor 12 relative to the machine frame 2, and can continuously and automatically control positioning of the point of impingement 16 of the milled material 14 via the slewing angle and/or the elevation angle and/or the conveying speed of the transport conveyor 12 so that the discharged milled material 14 impinges, as a minimum, within the loading surface 15. Alternatively, the alterable position of the loading surface 15 of the transport vehicle 10 may also be continuously located relative to the transport conveyor 12 in order to perform the preferably automatic control process.

To improve the reliability of the control process and to avoid controlling errors, the detection and control unit 24 comprises an analysis device 40 which analyses faults or errors in the digital image 48 which is generated by the image-recording system 28 comprising no less than one sensor 26.

The image-recording system 28 may be faulty as a result of weather conditions, for example, as a result of disturbing branches of trees, as a result of glare or also as a result of electricity and system failure so that the automatic control of the machine and especially the automatic slewing angle control of the transport conveyor 12 may thus be impaired at least temporarily.

The analysis device 40 can analyse the image pixels of the digital image 48 generated by the sensor 26 and, in case of faults or errors detected, generate a warning signal or control signal 46 which can directly influence the controller 3, or generate an audible or visual warning signal, for example, on a screen 44 which displays the digital image 48 for the operator of the milling machine 1.

In case of a warning signal, the attention of the operator can be brought about so that the operator can examine and monitor the automatic control process in the presence of a warning signal 46.

Alternatively, there can also be a direct intervention in the controller 3 via a control signal 47 generated by the analysis device 40 in order to, for example, stop the milling operation or in order to stop the transport conveyor 12 or in order to generate an emergency-stop signal.

The analysis device 40 may additionally be connected to a frozen-image detection device 42 which monitors the failure or an alteration over time of the image signals of the image pixels of the sensor 26 in the digital image 48.

The frozen-image detection device 42 may also monitor the alteration over time of a mark 50 present in the image field of the digital image 48 and alterable in a defined fashion. Said mark 50 is intended to change over time in a specified rhythm so that a frozen image can be identified if said change of the mark 50 in the defined section of the image field does not occur.

In case of the presence of two sensors 26 pointed at the same image field, a frozen image can also be detected if the image 48 of the one sensor differs from the other image 48 of the second sensor.

Independent of the frozen-image detection, the analysis device 40 can also monitor the image pixels of the no less than one sensor 26 for unchanging image information and issue a warning signal or control signal 46 if a part of the image information remains unchanged over a specified period of time. This may occur, for example, if a part of the sensor 26 is covered by, for example, a leaf.

Independent of the frozen-image detection, it can further be analysed by means of the analysis device 40 as to whether there is an undesirable change in position of the no less than one sensor 26.

To this end, a second mark 52 may be specified in the image field of the image 48, the coordinates of which inside the image field are monitored. If the position of the mark 52 within the image field changes, the image sensor 26 has changed as a result of, for example, a collision with an object.

It is understood that the alterable mark 50 may also be used for these purposes.

The marks 50, 52 are arranged in a fixed position at the machine frame or in a fixed position relative to the transport conveyor in such a fashion that they are detected by the image field of the sensor 26.

The analysis device 40 may also determine, independent of the frozen-image detection, whether the image-recording system 28 is subject to glare. To this end, the maximum signal is monitored, as a minimum, in a part of the image pixels, with the analysis device 40 issuing a warning signal or a control signal in the event of glare.

In case of glare, an electronic or optical dimming of the sensor 26 or of the optical system of the same may be effected.

Alternatively, it may also be specified in the event of glare for the sensor 26 or a camera in which the sensor 26 is contained, respectively, to be pivoted about a small angular amount without significantly changing the image field detected. Said minor pivoting movement may be reversed again in case of discontinuation of the glare.

It is understood that the sensor 26 or the image-recording system 28, respectively, is illustrated only schematically in the position above the transport conveyor 12 shown in FIGS. 1 and 2, and that the image-recording system 28 may also be arranged below or to the side of the transport conveyor 12 or at the milling machine 1.

Specifically, two image-recording systems 28 may also be arranged on both sides of the transport conveyor 12 and/or an image-recording system 28 may be used which comprises a stereo camera.

In this arrangement, the camera systems may comprise optics (fisheye lenses) which allow an angle of view of up to 180° or are provided with lenses featuring an alterable focal length.

The detection and control unit 24 may also undertake the task of filling the loading surface 15 in a uniform fashion. A loading program may be specified for this purpose in order to load the loading surface 15 in accordance with a predetermined program. In this context, the filling condition on the loading surface 15 may be detected and analysed by the image-recording system 28 in order to continuously control the conveying speed and/or the position of the discharge end 13 of the transport conveyor 12 relative to the loading surface 15.

The invention claimed is:

1. An automotive milling machine comprising:
a machine frame;
a working drum supported from the machine frame for milling off milled material;
a transport conveyor arranged to receive the milled material milled off by the working drum and to discharge the milled material onto a loading surface of a transport vehicle, the transport conveyor being slewable relative to the machine frame;
an image recording system arranged to monitor an alterable position of the loading surface of the transport vehicle, via at least one sensor configured to generate at least one digital image of the loading surface; and
a controller configured to detect an error in the at least one digital image.

2. The automotive milling machine of claim 1, wherein:
the controller is configured to generate a warning signal in the event of an error.

3. The automotive milling machine of claim 1, wherein:
the controller is configured to generate a control signal in the event of an error.

4. The automotive milling machine of claim 1, wherein:
each image of the at least one digital image is made up of a plurality of image pixels; and
the controller is configured to monitor an alteration over time of at least a part of the image pixels of the at least one digital image.

5. The automotive milling machine of claim 1, wherein:
the controller is configured to monitor an alteration over time of a mark present in an image field of the digital image.

6. The automotive milling machine of claim 1, wherein:
each image of the at least one digital image is made up of a plurality of image pixels; and
the controller is configured to monitor at least a part of the image pixels of the at least one digital image for unchanging image information, and to issue a signal in the event a part of the image information remains unchanged over a specifiable period of time.

7. The automotive milling machine of claim 1, wherein:
the controller is configured to detect an undesirable change in position of the at least one sensor by detecting a mark present in an image field of the at least one digital image.

8. The automotive milling machine of claim 1, wherein:
each image of the at least one digital image is made up of a plurality of image pixels; and
the controller is configured to monitor a presence of a maximum signal in at least a part of the image pixels, and to issue a signal in the event of glare.

9. The automotive milling machine of claim 8, wherein:
the image recording system is configured to provide a dimming of the at least one sensor in the event of glare.

10. The automotive milling machine of claim 8, wherein:
the image recording system is configured to pivot the at least one sensor by a small angular amount without significantly changing an image field of the at least one digital image in the event of glare.

11. The automotive milling machine of claim 1, wherein:
the controller is configured to control travelling operation and milling operation of the milling machine.

12. The automotive milling machine of claim 1, in combination with at least one transport vehicle movable independently of the milling machine and positionable relative to the milling machine such that the milled material worked off by the milling machine is dischargeable onto the transport vehicle.

13. A method of discharging worked-off milled material of an automotive milling machine onto a loading surface of a transport vehicle, the method comprising:
(a) working off milled material with a working drum of the milling machine;
(b) transporting the milled material from the working drum with a transport conveyor and discharging the milled material from the transport conveyor onto the loading surface of the transport vehicle, the transport conveyor being slewable relative to a machine frame of the milling machine;
(c) continuously monitoring an alterable position of the loading surface of the transport vehicle relative to at least one of the machine frame and the transport conveyor by continuously generating at least one digital image of the loading surface with an image-recording system; and
(d) analyzing the at least one digital image with an analysis system to detect errors in the at least one digital image.

14. The method of claim 13, further comprising:
in the event of detection of an error in step (d), generating a warning signal.

15. The method of claim 13, further comprising:
in the event of detection of an error in step (d), generating a control signal.

16. The method of claim 13, wherein:
step (d) further comprises monitoring an alteration over time of at least a part of a plurality of image pixels of the at least one digital image to detect a frozen image.

17. The method of claim 13, further comprising:
step (d) further comprises detecting a frozen image by monitoring an alteration over time of a mark present in an image field of the at least one digital image, the mark being alterable in a defined manner.

18. The method of claim 13, further comprising:
controlling travelling operation and milling operation of the milling machine with a controller; and
receiving signals from the analysis system in the controller.

* * * * *